(12) United States Patent
Palermo et al.

(10) Patent No.: US 7,624,884 B2
(45) Date of Patent: Dec. 1, 2009

(54) RAILROAD CAR DRAFT GEAR

(75) Inventors: Michael R. Palermo, Hoffman Estates, IL (US); Richard A. Carlstedt, Wheaton, IL (US); Kris C. Jurasek, Aurora, IL (US)

(73) Assignee: Miner Enterprises, Inc., Geneva, IL (US)

( * ) Notice: Subject to any disclaimer, the term of this patent is extended or adjusted under 35 U.S.C. 154(b) by 189 days.

(21) Appl. No.: 11/805,529

(22) Filed: May 23, 2007

(65) Prior Publication Data

US 2008/0290058 A1    Nov. 27, 2008

(51) Int. Cl.
*B61G 9/06* (2006.01)
(52) U.S. Cl. .................... 213/22; 213/44; 213/32 A; 213/40 R; 213/45
(58) Field of Classification Search ............. 213/22, 213/44
See application file for complete search history.

(56) References Cited

U.S. PATENT DOCUMENTS

| | | | |
|---|---|---|---|
| 2,667,277 A * | 1/1954 | Mulcahy | ............ 213/32 R |
| 3,741,406 A | 6/1973 | Anderson | |
| 4,198,037 A | 4/1980 | Anderson | |
| 5,104,101 A * | 4/1992 | Anderson et al. | ............ 267/219 |
| 5,351,844 A | 10/1994 | Carlstedt | |
| 6,478,173 B2 | 11/2002 | Carlstedt | |

OTHER PUBLICATIONS

International Searching Authority/USPTO; International Search report regarding PCT/US2008/05800; Sep. 18, 2008; 2 pages.
International Searching Authority/USPTO; Written Opinion of the International Searching Authority regarding PCT/US2008/05800; Sep. 18, 2008; 6 pages.

* cited by examiner

*Primary Examiner*—S. Joseph Morano
*Assistant Examiner*—Zachary Kuhfuss
(74) *Attorney, Agent, or Firm*—Law Office of John W. Harbst

(57) ABSTRACT

A railroad car draft gear including a housing having an open end with a friction clutch assembly arranged in operable combination therewith. An elongated elastomeric spring assembly is disposed within the housing for storing energy during axial compression of the draft gear. A spring seat is arranged within the housing between the spring assembly and an end portion of each friction member forming part of the friction clutch assembly. The spring seat defines a surface, arranged in direct contacting relation with an end of the spring assembly, and defines at least one surface incongruity for limiting radial expansion with the elastomeric spring at the end of the spring assembly arranged in direct contacting relation with the spring seat along at least two axes when an axial load is applied to the draft gear.

20 Claims, 10 Drawing Sheets

RAILROAD CAR DRAFT GEAR

FIELD OF THE INVENTION

The present disclosure generally relates to railroad cars and, more specifically, to a railroad car draft gear utilizing an elastomeric spring assembly for storing and dissipating energy during operation of the draft gear.

BACKGROUND OF THE INVENTION

Railroad car draft gears have been used for many years at opposite ends of a railcar to absorb and cushion impact forces. Most railcar draft gears include a cast housing having an inwardly tapered bore at an open end, a spring disposed within the housing, a series of metal friction shoes or members arranged in the tapered bore of the housing and movable against the spring upon compression of the draft gear, and a wedge disposed in operable combination with the friction members such that impact blows directed against the wedge are transferred axially to the spring and radially to the housing. In most railcar draft gears, a spring seat or follower is arranged between an end portion of each friction member and the spring.

Recently, elastomeric materials have been used and accepted as replacements for steel springs. While offering advantageous results, unless the load applied to the elastomeric spring is perfectly aligned with the longitudinal axis of the spring, elongated elastomeric springs tend to snake or buckle under load. One elastomeric spring assembly offering beneficial results is disclosed in U.S. Pat. No. 5,351,844 to R. A. Carlstedt and includes multiple elastomeric springs stacked in axial relation relative to each other. A metal plate is bonded or otherwise secured to opposed faces of each elastomeric spring. The metal plate bonded to each face of each elastomeric spring offers numerous advantageous results. The metal plates act to limit snaking and/or buckling problems. Moreover, the metal plates bonded to opposed faces of each elastomeric spring yields increased work capacity from each spring. Such a spring assembly has been successfully used for years in combination with railcar draft gears.

Railcar manufacturers and suppliers for such railcar manufacturers are continually seeking methods and ways of reducing the manufacturing costs of railcars and the components used to build such railcars without having to sacrifice performance and quality. When considering costs savings in connection with draft gears, however, the options are few. First, the size of the draft gear housing cannot be changed without adversely effecting the relationship with a fixed size pocket provided in a railcar centersill in which the draft gear is accommodated. Second, and with the size of the draft gear housing being fixed, the amount of steel used to form the draft gear housing has already been minimized as with openings and voids wherever possible. Moreover, the size of the elastomeric spring assembly used in the draft gear to absorb impacts, as defined by the number of the elastomeric springs comprising the spring assembly, cannot be reduced without adversely effecting draft gear performance and operation.

Thus, there remains a continuing need and desire to provide a railcar draft gear capable of offering the same operating characteristics as known railcar draft gears but which is more economical to manufacture.

BRIEF DESCRIPTION OF THE INVENTION

In view of the above, and in accordance with one aspect, there is provided a railroad car draft gear including a hollow housing having an open end with a series of friction members arranged in operable combination therewith. A wedge is arranged for axial movement relative to the open end of the housing and in operable combination with the friction members. An elastomeric spring assembly is axially arranged within the hollow housing for storing energy applied to said wedge during operation of the draft gear. One end of the spring assembly is arranged in contacting relation with a closed end of the housing. A spring seat is arranged within said housing between the spring assembly and an end portion of each friction member.

According to this aspect, and unlike other known spring assemblies, the metal plate at the end of the spring assembly arranged adjacent to the spring seat has been removed and eliminated, thus, resulting in costs savings. The spring seat defines a surface, arranged in direct contacting relation with an end of the spring assembly. The spring contacting surface on the spring seat has an incongruity for limiting radial expansion of an elastomeric pad forming part of the spring assembly and which is arranged in direct contacting relation with the spring seat along at least two axes when an axial load is applied to the wedge of the draft gear.

In one embodiment, the incongruity on the spring contacting surface of the spring seat is defined by an annular groove concentrically arranged about a longitudinal axis of the draft gear housing. In another form, the incongruity on the spring contacting surface of the spring seat is defined by a series of equi-angularly disposed recesses concentrically arranged about a longitudinal axis of the housing. In still another form, the incongruity on the spring contacting surface of the spring seat can be configured as an annular projection or a series of equi-angularly spaced and shaped projections for gripping and resisting easy outward radial movement of the adjacent elastomer spring.

In another form, the metal plate at the end of the spring assembly arranged adjacent to the draft gear housing has also been removed and eliminated. Preferably, a surface on the draft gear housing arranged in contacting relation relative to the adjacent end of the spring assembly defines an incongruity for limiting radial expansion of the end of the spring assembly when an axial compressive load is applied to the draft gear.

According to another aspect, there is provided a railroad car draft gear including a hollow housing having an open end and a series of friction members arranged in operable combination with the open end of the housing. A wedge is arranged for axial movement relative to the open end of the housing and in operable combination with the friction members. A multi-tiered spring assembly is arranged within the draft gear housing for storing and dissipating energy applied to the wedge during compression of the draft gear. One end of the spring assembly is arranged in contacting relation with a closed end of the housing. The multi-tiered spring assembly includes a series of stacked elastomeric springs with at least one plate between each pair of axially adjacent springs. A spring seat is arranged within the draft gear housing between the multi-tiered spring assembly and an end portion of each friction member.

According to this aspect, and to reduce the manufacturing cost of the railcar draft gear, the metal plate normally disposed between the end of the multi-tiered spring assembly and the spring seat has been removed and eliminated. A surface on the spring seat, arranged in contacting relationship with the multi-tiered spring assembly, preferably defines at least one incongruity for allowing the elastomer of the spring assembly, arranged adjacent to the spring seat, to deform and operably combine with the incongruity thereby limiting radial expansion of the elastomeric spring arranged in contiguous relation relative to the spring seat.

Preferably, the spring contacting surface of the spring seat defines a recess coaxially arranged relative to a longitudinal axis of the draft gear housing. In one form, the incongruity on the spring contacting surface of the spring seat is defined by an annular groove concentrically arranged about a longitudinal axis of the housing. In an alternative embodiment, the incongruity on the spring contacting surface of the spring seat is defined by a series of equi-angularly disposed recesses concentrically arranged about a longitudinal axis of the draft gear housing.

The metal plate at the opposite end of the multi-tiered spring assembly, arranged adjacent to the draft gear housing, has also preferably been removed and eliminated, thus, resulting in further costs savings. In one form, a surface on the draft gear housing arranged in contacting relation relative to the spring assembly preferably defines an incongruity for limiting radial expansion of the end of the elastomeric spring when an axial compressive load is applied to the wedge of the draft gear.

According to another aspect, there is provided a railroad car draft gear including an elongated hollow housing have an open first end and a closed second end along with a plurality of friction members arranged in operable combination with the open end of the draft gear housing. A wedge is arranged for axial movement relative to the open end of the draft gear housing and in combination with the series of friction members. A multi-tiered spring assembly is disposed within the hollow housing for storing and dissipating energy applied to the wedge during operation of the draft gear. A first end of the spring assembly is arranged in contacting relation with the closed end of the draft gear housing. The spring assembly includes a series of stacked elastomeric springs with at least one plate between each pair of axially adjacent springs. A second end of the spring assembly defines a protrusion arranged generally coaxial with a longitudinal axis of the housing and axially extending from the spring disposed the furthest from the closed end of the draft gear housing. A spring seat is arranged in the housing between the second end of the spring assembly and an end portion of each friction member. The spring seat defines a surface arranged in direct contacting relation with the second end of the spring assembly.

To aid in costs savings, the metal plate normally disposed between the multi-tiered spring and the spring seat has been removed and eliminated. The spring contacting surface on the spring seat, arranged in direct contacting relation with an elastomeric spring at a second end of the spring assembly, defines an incongruity for limiting radial expansion of the elastomeric spring at the second end of the spring assembly along at least two axes. Preferably, the spring contacting surface on the spring seat further defines a central recess for accommodating the protrusion axially extending from the end of the spring assembly so as to advantageously affect and maintain axial alignment of the multi-tiered spring relative to a longitudinal axis of the draft gear housing.

In one form, the incongruity on the spring contacting surface of the spring seat is defined by an annular groove concentrically arranged about a longitudinal axis of the housing. In an alternative form, the incongruity on the spring contacting surface of the spring seat can be defined by a series of equi-angularly disposed recesses concentrically arranged about a longitudinal axis of the draft gear housing.

To further aid in reducing the manufacturing cost of the railroad car draft gear, the metal plate at the opposite end of the multi-tired spring is also eliminated. In this regard, a surface on the draft gear housing arranged in contacting relation relative to the end of the multi-tiered spring assembly defines an incongruity for limiting radial expansion of the adjacent spring when an axial compressive load is applied to the wedge of the draft gear.

DETAILED DESCRIPTION OF THE INVENTION

Figure 1:
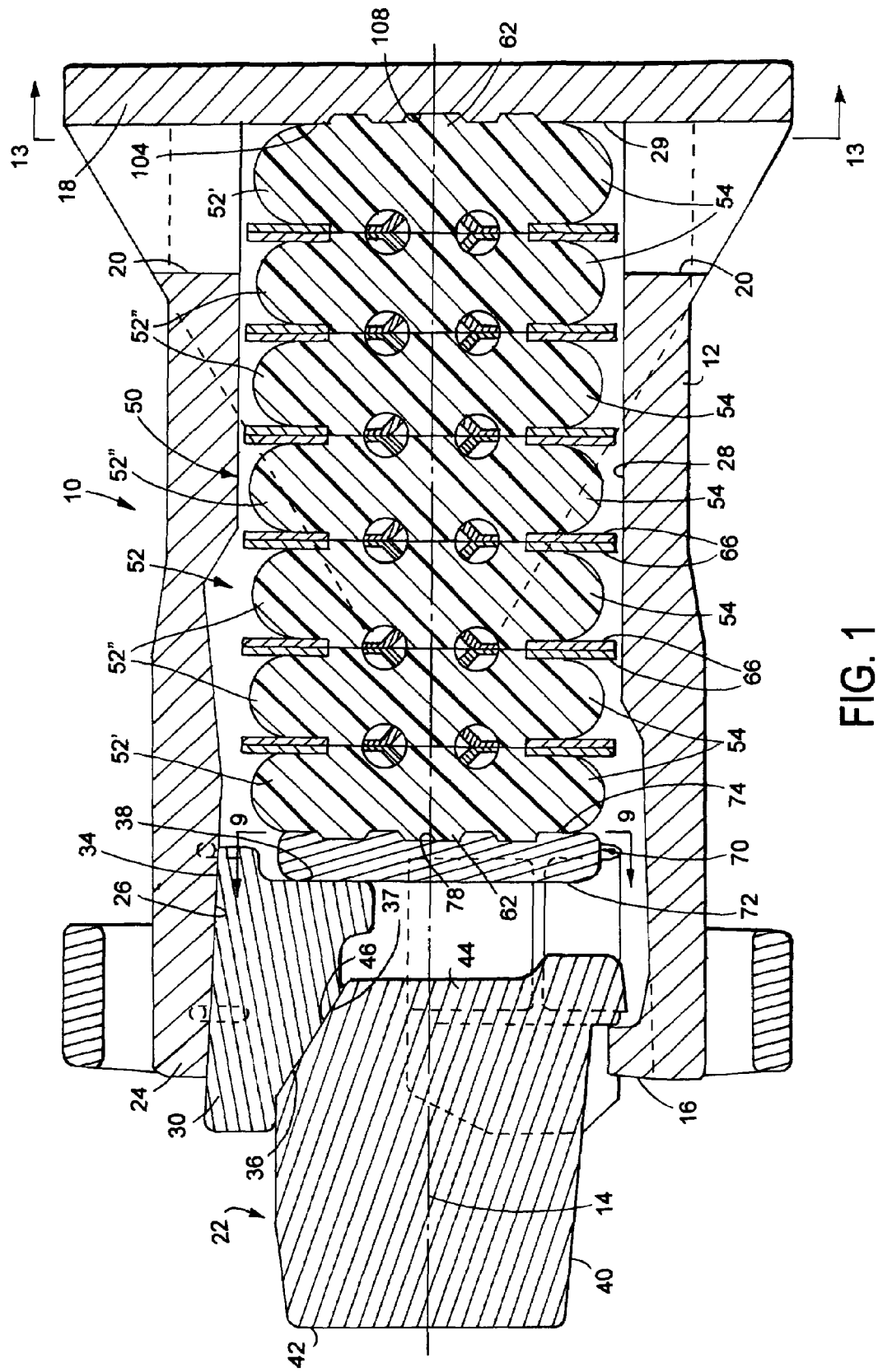
FIG. 1 is a longitudinal section view of one form of a railcar draft gear.

While the present invention is susceptible of embodiment in multiple forms, there is shown in the drawings and will hereinafter be described preferred embodiments of the invention, with the understanding the present disclosure is to be considered as setting forth exemplifications of the invention which are not intended to limit the invention to the specific embodiments illustrated and described.

Referring now to the drawings, wherein like reference numeral indicate like parts throughout the several views, there is shown in FIG. 1. a railroad car draft gear, generally indicated by reference numeral 10, adapted to be carried within a yoke (not shown) arranged in operable combination within a centersill (not shown) of a railcar. The draft gear 10 includes an axially elongated hollow housing 12 defining a longitudinal axis or centerline 14 for the draft gear 10 and which is open at a first end 16 and closed toward a second end 18. Housing 12 is preferably cast and can include a number of weight reducing openings 20.

In the embodiment shown in FIG. 1, draft gear 10 is provided with a friction clutch assembly 22 disposed toward end 16 of housing 12. As shown, housing 12 is provided, adjacent end 16, with a relatively thick walled friction shell section 24 having three (with only one being shown in FIG. 1) longitudinally extended and tapered internal or inner friction surfaces 26. Each tapered surface 26 axially converges toward the closed end 18 of draft gear housing 12.

Spaced longitudinally or axially inward of shell section 24, draft gear housing 12 is provided with an internal cavity 28. As shown in FIG. 1, cavity 28 opens to the first end 16 of housing 12 and terminates at an end wall 29 defined toward the second end 18 of the draft gear housing 12. In the illustrated embodiment, the portion of the draft gear housing 12 longitudinally spaced axially inward from shell section 24 is characterized by a thinner wall section having a generally circular cross-sectional configuration.

Figure 2:
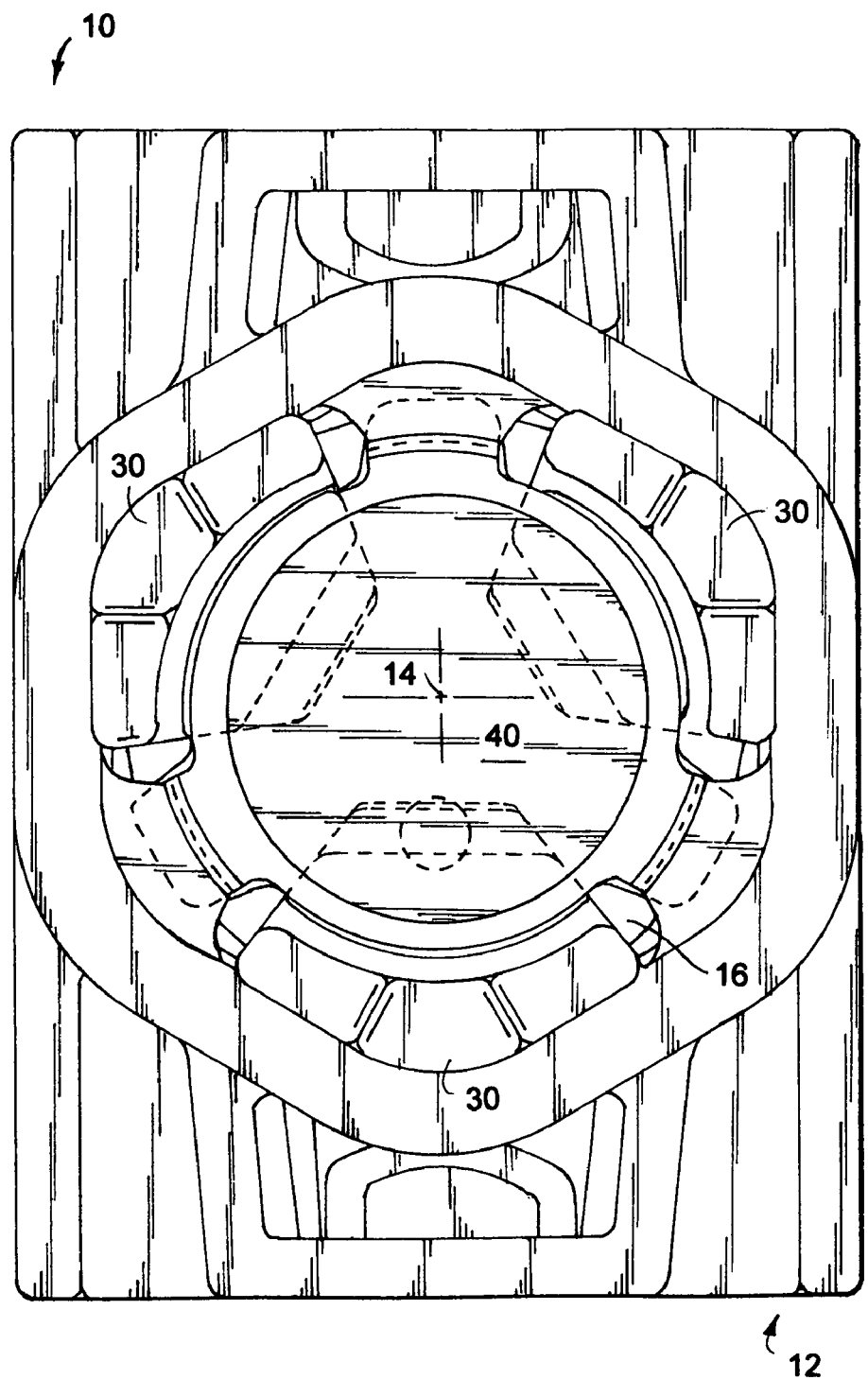
FIG. 2 is a top plan view of the draft gear shown in FIG. 1.

In the embodiment shown in FIGS. 1 and 2, the friction clutch assembly 22 for draft gear 10 includes three friction shoes 30 (with only one being shown in FIG. 1). In the illustrated embodiment, the friction shoes or members 30 are arranged in operable combination with the open end 16 of the draft gear housing 12. The friction shoes or members 30 are equi-angularly disposed about the axis 14 of the draft gear 10. As is conventional, an external tapered surface 34 on each friction member 30 is arranged in sliding operable combination with one of the tapering internal surfaces 26 on the friction shell section 22 of the draft gear housing 12. Moreover, each friction member 30 defines an internal tapered surface 36 which, as shown in FIG. 1, converges toward the centerline 14 of the draft gear 10

In the illustrated embodiment, friction clutch assembly 22 of draft gear 10 further includes a wedge 40 arranged for axial movement relative to the end 16 of housing 12. As shown in FIG. 1, an outer end 42 of wedge 40 axially extends beyond the first end 16 of housing 12 such that an axial compressive force can be applied thereto during operation of the draft gear 10. As known, wedge 40 is arranged in operable combination with the friction members 30. When draft gear 10 is assembled as shown in FIG. 1, the tapered surfaces 36 of the friction members 30 combine with each other to define a pocket 37 for receiving and accommodating an inner end 44 of wedge 40. In the form shown in FIG. 1, the inner end 44 of wedge 40 defines a frusto-conical surface 46 which slides along and operably engages with the tapered surface 36 of each friction members 30.

An axially elongated spring assembly 50 is arranged within the cavity 28 of the draft gear housing 12 for storing and dissipating energy imparted or applied to the end 42 of wedge 40 during axial compression of the draft gear 10. One end of spring assembly 50 is arranged in contacting relation with the end wall 29 of housing 12. As is known, spring assembly 50 is precompressed during assembly of the draft gear 10 and also serves to maintain the components of the friction clutch assembly 22 including members 30 and wedge 40 in operable engagement with each other and within the draft gear housing 12 both during operation of the draft gear 10 as well as during periods of non-operation of the draft gear 10. Suffice it to say, the draft gear housing 12, the friction members 30, and wedge 40 are each suitably configured in a conventional and well known manner to coact with each other such that they are all positively retained in operable combination under the resilient compressive force of spring assembly 50.

In the form shown, spring assembly 50 has a multi-tiered construction including a series of longitudinally stacked elastomeric compression springs, generally identified by reference numeral 52. As shown in FIG. 1, at least one metal plate 66 is arranged between each pair of axially adjacent springs 52. In the illustrated embodiment, the springs are divisible into two groups. That is, as shown in FIG. 1, the elastomeric springs include two end springs 52', disposed at opposed ends of spring assembly 50, and a series of intermediary springs 52".

To reduce manufacturing costs, the end springs 52' and intermediary springs 52" embody similar technology and parts. One element common to the end springs 52' and intermediary springs 52" is an elastomeric spring pad 54. The elastomeric spring pad 54 is formed using the process and methodology disclosed in U.S. Pat. No. 5,351,844 to R. A. Carlstedt; the applicable portions of which are incorporated herein by reference. Suffice it to say, the elastomeric spring pad 54 of each spring 52' and 52" is formed from a copolyester polymer elastomer such as that manufactured and sold by DuPont under the tradename "HYTREL" and the art known equivalents thereto.

The copolyester polymers previously referred to come in pellet form for use in casting or extruding. An initial step in the process of forming each spring 52', 52" involves creation of a preform block of material, generally identified in FIG. 3 by reference numeral 60. The preform 60 has a predetermined diameter PD and is formed with a pair axially aligned projections 62 and 64 extending from opposed faces or ends of the preform 60.

The next step in the spring forming process involves working the preform 60 as through precompression of the preform 60. The process of working the preform 60 and thereby transmuting the preform into an elastomeric spring pad 54 is described in further detail in the above-mentioned U.S. Pat. No. 5,351,844 to R. A. Carlstedt.

When forming any one of the intermediary springs 52", the preform 60 is preferably precompressed between a pair of metal plates 66. Each plate 66 is arranged in operable combination with opposed ends or load faces 67', 67" (FIG. 3) of the preform 60. To reduce manufacturing costs, the plates 66 positioned in operable combination with each load face 67', 67" (FIG. 3) of the preform 60 are identical to each other.

Figure 4:
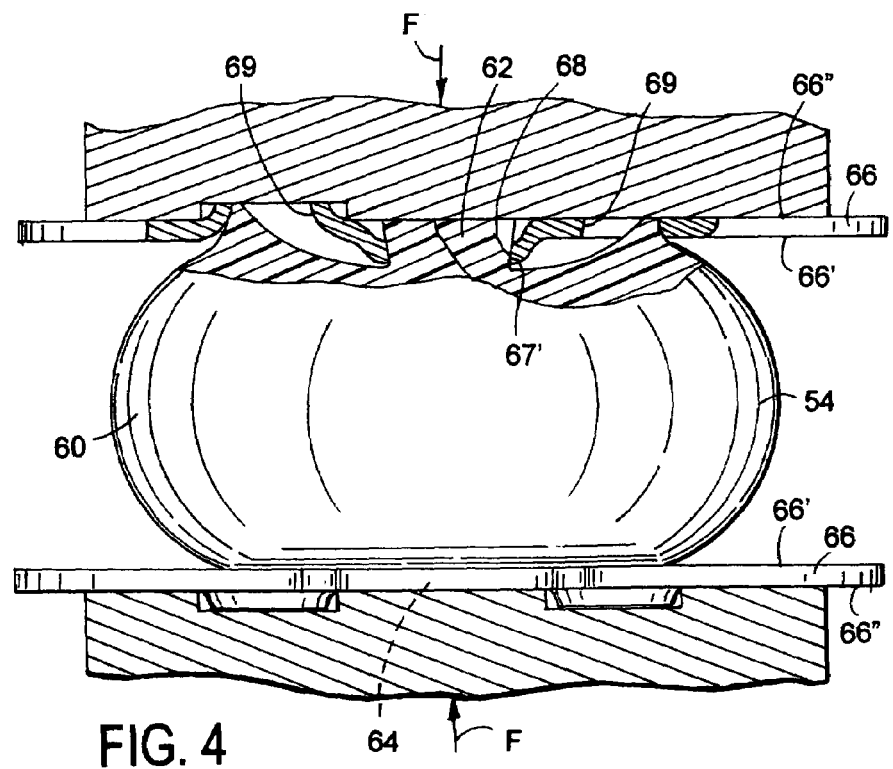
FIG. 4 is a view schematically showing formation of an elastomeric spring, partly in section, forming part of the elastomeric spring assembly used in operable combination with the railcar draft gear shown in FIG. 1.

As shown in FIG. 4, each plate 66 has inner and outer major planar surfaces 66' and 66", respectively, with a depressed central portion 67 (with only one being shown). The depressed central portion 67 of each plate 66 defines a socket 68 extending through the plate 66 and sized to receive and maintain the shape of the protrusion 62, 64 extending from the preform 60. The socket 68 defined by each plate 66 serves to positively locate the plate 66 relative to the preform 60. As shown in FIG. 4, and after plates 66 are arranged at opposite ends of and relative to the preform, a force F is applied to the plates 66 in a sense as to cause axial compression of the preform 60, in a direction generally normal to either major planar plate surface 66' and 66", thereby transmuting preform 60 into the elastomeric spring pad 54.

Figure 5:
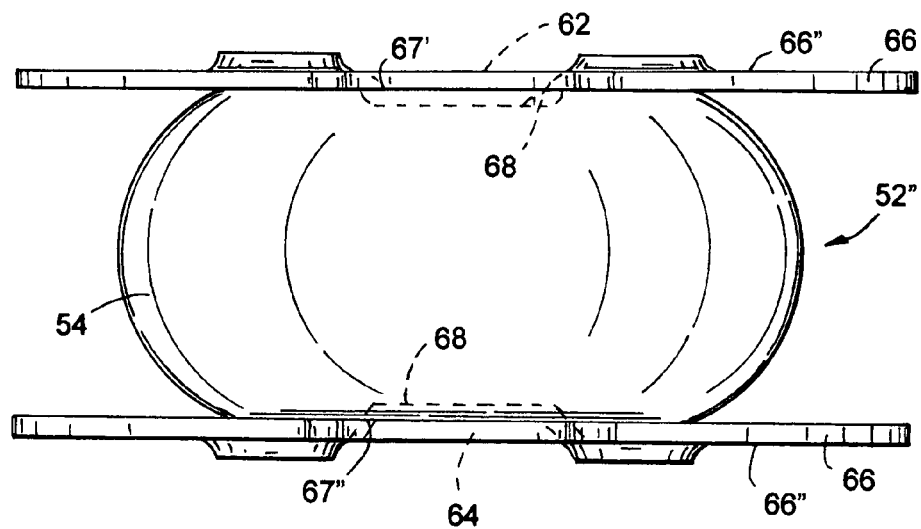
FIG. 5 is a side view of the elastomeric spring resulting from the process schematically shown in FIG. 4.

The intermediary spring 52" resulting from the above-described process is illustrated in FIG. 5. That is, and after working the preform, the load faces 67', 67" each have the metal plate 66 arranged or bonded in operable combination therewith. As shown in FIG. 5, and after intermediary spring 52" is formed, a lengthwise portion of each axial projection 62 and 64, respectively, projects through the respective socket 68 with an end of each projection 62, 64 terminating in generally planar relationship with the outer surface 66" of each plate 66.

Figure 6:
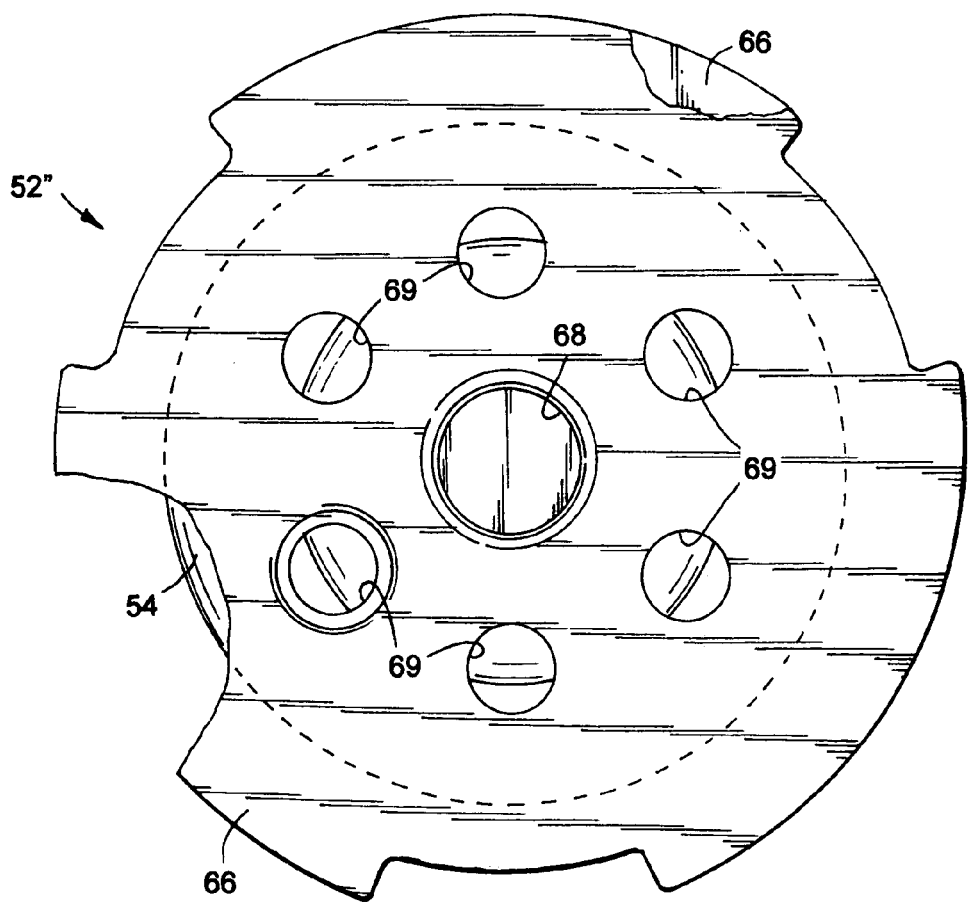
FIG. 6 is a plan view of the elastomeric spring shown in FIG. 5.

To inhibit the elastomer from easily flowing along the inner surface 66' of each plate 66 as the compressive force is applied to the preform, a relatively simple manufacturing procedure is used to obtain a mechanical bond between the plates 66 and the preform. One such procedure involves providing each plate 66 with a series or multiple holes or openings 69, as shown in FIGS. 4 and 6, which can be stamped or otherwise provided in the plate 66. In one form, six apertures or openings 69 are arranged in a circular pattern in each plate 66. In the embodiment shown by way of example in FIG. 6, the openings 69 are equi-angularly spaced substantially the same radial distance relative to each other from the center of the plate 66 so that an equal holding force is provided by each plate 66 on the adjacent spring pad 54. Of course, the number and spacing of the openings 69 provided on each plate 66 can vary without detracting or departing from the spirit and scope of the present disclosure.

During working of the preform 60, the elastomer plastically deforms and flows into each opening 69 whereby establishing a mechanical bond between each plate 66 and the spring pad 54. It will be appreciated the plates 66 can be designed differently from that shown and described but yet offer a bonding relationship between each plate 66 and the spring pad 54 without detracting or departing from the true spirit and scope of the present disclosure.

The process of forming the end springs 52' is substantially similar to that discussed above regarding the intermediary springs 52" except the end spring 52' has only a single metal plate 66 bonded or otherwise secured to only one of the load faces 67', 67" thereof. Suffice it to say, each end spring 52' is formed from a preform 60 like that shown in FIG. 3 having axial projections 62, 64 extending from opposed ends thereof.

Figure 7:
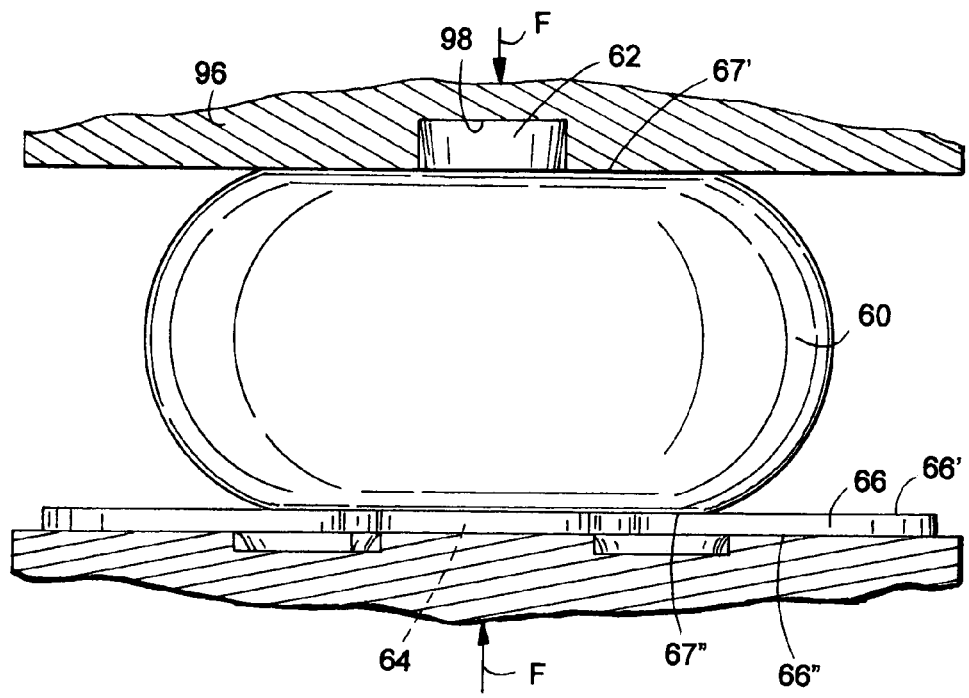
FIG. 7 is a view schematically showing formation of another elastomeric spring, partly in section, forming another part of the elastomeric spring assembly.

When forming either end spring 52', the preform 60 is precompressed with a plate 66 provided in operable combination with only one load face 67" as shown by way of example in FIG. 7. To reduce manufacturing costs, the plate 66, secured in operable combination with the one load face 67" of spring pad 54 used to form spring 52' is preferably the same as the plates 66 secured to the ends of the intermediary springs 52" discussed above.

During working, a suitably configured plate or member 96 is arranged to operably engage with the opposite end or face 67 of preform 60. As shown in FIG. 7, plate or member 96 has a recess or pocket 98 for receiving and maintaining the axial extension 62 of the preform 60. A force F is then applied to the plates 66, 96 in a sense as to cause axial compression of the preform 60 whereby transmuting the preform 60 into an elastomeric spring.

Figure 8:
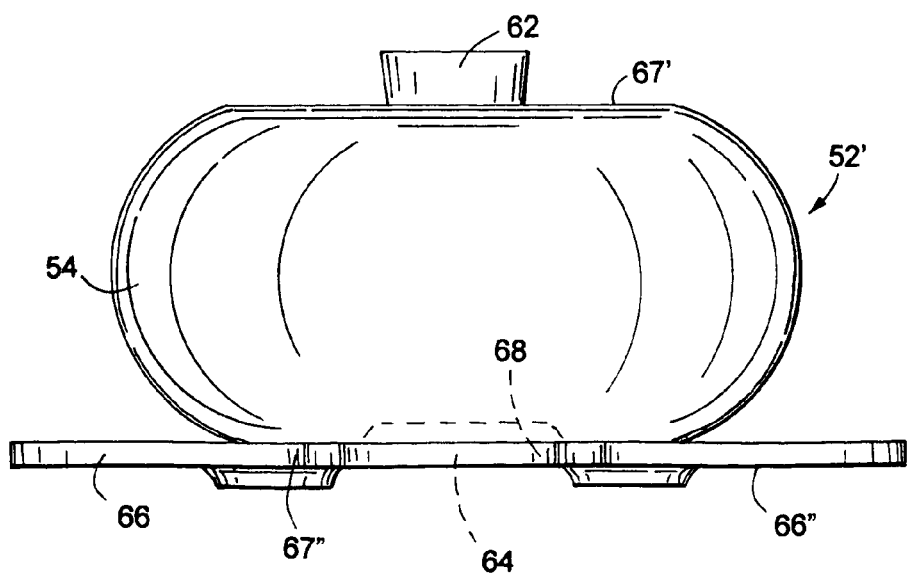
FIG. 8 is a side view of the elastomeric spring resulting from the process schematically shown in FIG. 7.

The end spring 52' resulting from the above-described process is illustrated in FIG. 8. After working the preform 60, only one load face 67', 67" of each end spring 52' has a metal plate 66 bonded thereto. Axial compression of the preform 60 is effected such that the axial extension 64 preferably projects through the socket 68 (FIG. 8) of plate 66 with an end of the extension 64 terminating in generally planar relationship with the outer major planar surface 66" of plate 66. Axial compression of the preform 60, forming the elastomeric spring pad 54 of an end spring 52', however, is effected such that the projection 62 of the preform 60 remains in axially extending relation beyond the load face 67' of the resultant elastomeric spring.

Returning to FIG. 1, draft gear 10 further includes a spring seat or top follower 70 arranged within the housing 12 operably between spring assembly 50 and an end portion 38 of each friction member 30. The spring seat or follower 70 is adapted for longitudinal or axial movements in the housing 12 to axially compress the spring assembly 50 when impact forces are applied to the outer end 42 of wedge 40. As shown in FIG. 1, spring seat 70 has a first surface 72 for operably engaging with the end portion 38 of each friction member 30. The spring seat surface 72 is shown by way of example as being generally planar. It will be appreciated, however, spring seat surface 72 could have configurations other than planar without detracting or departing from the present disclosure. As shown in FIG. 1, the spring seat 70 also has a generally planar spring contacting surface 74 preferably extending generally normal to the axis 14 of draft gear 10 and arranged in contacting relation with the end of spring assembly 50.

Figure 9:
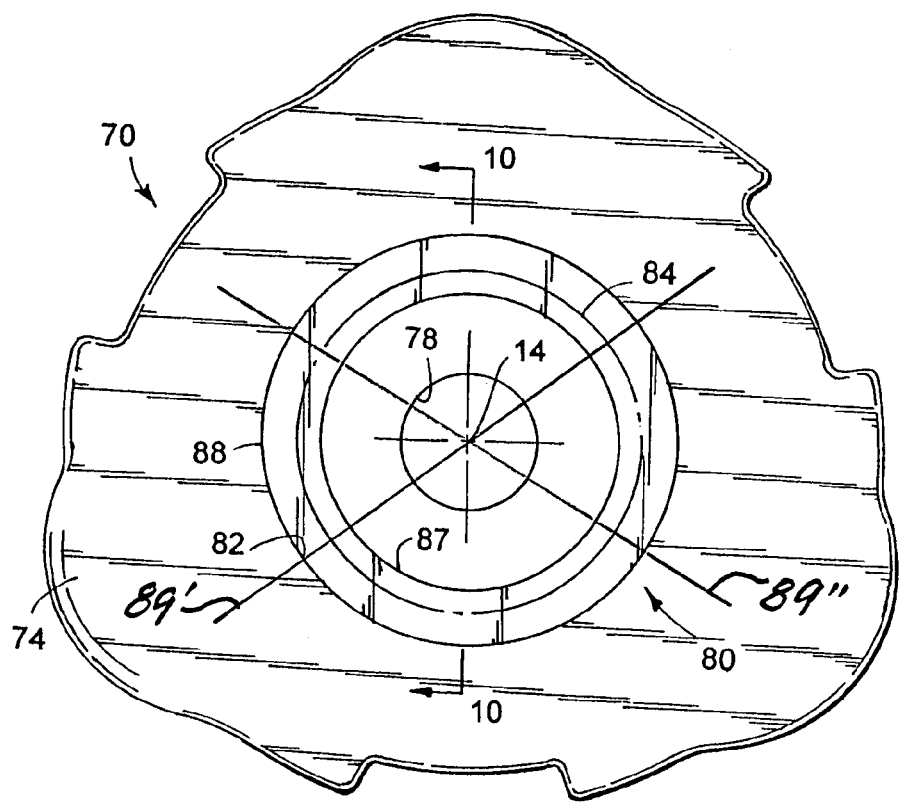
FIG. 9 is a plan view taken along line 9-9 of FIG. 1 and showing a spring engaging surface of a spring seat forming part of the railroad car draft gear.

As shown in FIGS. 1 and 9, the spring contacting surface 74 on spring seat 70 preferably defines a recess 78. When draft gear 10 is assembled, recess 78 is coaxially arranged relative to the longitudinal axis 14 of the draft gear 10. Recess 78 is configured to accommodate and fit closely about and along the axial extension 62 of the adjacent end spring 52' thereby enhancing axial alignment between the spring seat 70 and the spring assembly 50.

As shown in FIGS. 1 and 9, the spring contacting surface 74 on the spring seat 70 further defines at least one incongruity 80 for limiting radial expansion of the elastomer of the adjacent end spring 52' when an axial load is applied to the wedge 40 of the draft gear 10. As will be appreciated, the incongruity 80 defined by the spring contacting surface 74 of spring seat 70 can take a myriad of different designs without detracting or departing from the present disclosure. Suffice it to say, the incongruity 80 defined by the spring contacting surface 74 of spring seat 70 is configured such that it grips and resists radial elastomer flow during compression of the end spring 52'.

In the form shown by way of example in FIG. 9, the incongruity 80 on the spring contacting surface 74 of spring seat 70 is defined by an annular groove or recess 82 arranged concentrically about the longitudinal draft gear axis 14. The annular groove or recess 82 defines an annular centerline 84 radially spaced a predetermined distance from the longitudinal draft gear axis 14. Preferably, the diameter of the centerline 84 is generally equal to the predetermined diameter PD of the elastomeric preform 60 (FIG. 3) used to form end spring 52'.

In the illustrated embodiment, the annular groove or recess 82 has a generally constant radial width ranging between about 0.375 inches and about 0.562 inches. In a most preferred form, the annular groove or recess 82 has a generally constant radial width of about 0.503 inches. Moreover, recess 82 has a generally constant depth ranging between about 0.080 inches and about 0.188 inches. In a most preferred form, recess 82 has a generally constant depth of depth of about 0.094 inches.

Figure 10:
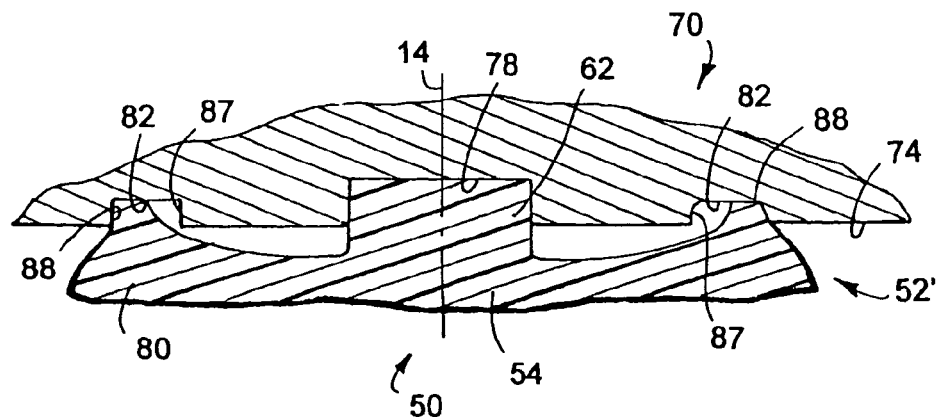
FIG. 10 is an enlarged sectional view taken along line 10-10 of FIG. 9.

As illustrated in FIG. 10, the annular groove or recess 82 defines inner and outer shoulders or abutments 87 and 88, respectively. The outer shoulder 88 of recess 82 limits radial expansion of the of the elastomeric spring pad 54 arranged adjacent to the spring seat 70. In the illustrated embodiment, the inner and outer shoulders or abutments 87 and 88 of recess 82 extend generally normal to the spring contacting surface 74 of spring seat 70. Of course, one or both of the inner and outer shoulders 87 and 88 of recess 82 can be angled between 65° and about 100° relative to the spring contacting surface 74 of spring seat 70 without detracting or departing from the spirit and scope of the present disclosure. Suffice it to say, when draft gear 10 is axially and repeatedly compressed, the elastomer of the adjacent end spring 52' flows into the surface incongruity 80 thereby limiting radial expansion of the elastomer of the adjacent end spring 52' (FIG. 10) along at least two axes which are generally indicated in FIG. 9 by reference numerals 89' and 89". Notably, the angular disposition of the two axes 89' and 89" illustrated in FIG. 9 are for exemplary purposes and this disclosure should not be construed or interpreted as being limited to the particular angular disposition of the axes shown in the drawing. Moreover, and although shown in FIG. 9 as being in generally normal or generally perpendicular relationship relative to each other, the axes 89' and 89" are not and do not necessarily have to be disposed in generally normal or generally perpendicular relationship relative to each other.

Figure 11:
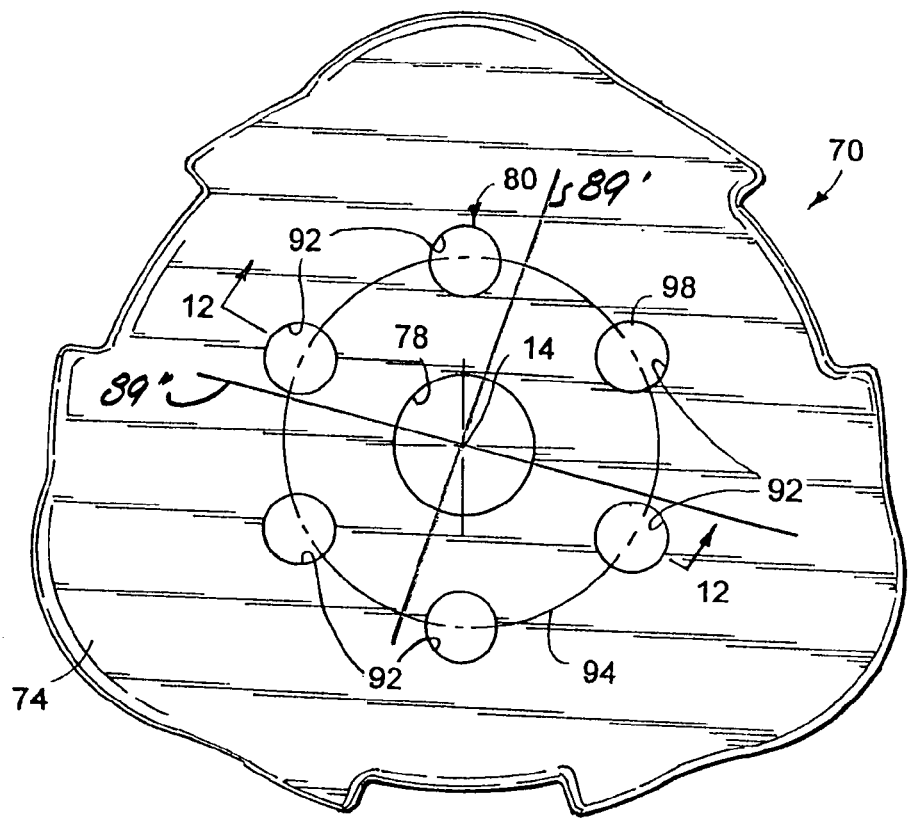
FIG. 11 is a plan view similar to FIG. 9 showing an alternative form of spring engaging surface on a spring seat used in combination with the present invention.
Figure 12:
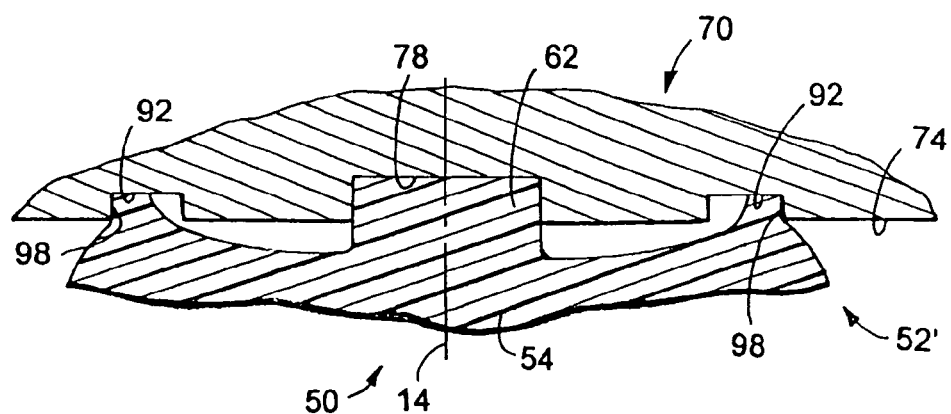
FIG. 12 is an enlarged sectional view taken along line 12-12 of FIG. 11.

The spring seat 70 illustrated in FIGS. 11 and 12 corresponds to that discussed above and illustrated in FIGS. 9 and 10 except for the configuration of the surface incongruity 80 for mechanically bonding the end spring 52' to spring seat 70. In the embodiment shown in FIG. 11, the incongruity 80 on the spring contacting surface 74 of spring seat 70 is defined by a series of recesses 92 preferably arranged concentrically about the longitudinal axis 14 of the draft gear 10. The recesses 92 are each of like diameter and are preferably arranged in a generally circular pattern about an annular centerline 94 spaced a predetermined radial distance from the longitudinal draft gear axis 14. In a preferred embodiment, the diameter of the annular centerline 94 is generally equal to the predetermined diameter PD of the elastomeric preform 60 (FIG. 3) used to form the end spring 52'. The series of recesses 92 are preferably equi-angularly disposed relative to each other such that an equal holding force is provided by the spring seat 70 on the adjacent end spring 52' of spring assembly 50. Of course, the number and spacing of the openings 92 provided on the spring seat 70 can vary from that shown without detracting or departing from the spirit and scope of the present disclosure.

In the exemplary embodiment, the recesses 92 have a diameter ranging between about 0.437 inches and about 0.75 inches. In a preferred form, each recess 92 has a diameter of about 0.563 inches. Moreover, each recess 92 has a depth ranging between about 0.77 inches and about 0.125 inches. In a preferred embodiment, each recess has a depth of about 0.094 inches.

As illustrated in FIG. 12, each recess 92 defines a radial shoulder or abutment 98 extending generally normal to the spring contacting surface 74 of spring seat 70 for limiting radial expansion of the of the elastomeric pad 54 of the end spring 52' arranged adjacent to the spring seat 70. Of course, the radial shoulder 92 of each recess 92 can be angled between about 65° and about 100° relative to the spring contacting surface 74 of spring seat 70 without detracting or departing from the spirit and scope of the present disclosure. Suffice it to say, when draft gear 10 is repeatedly compressed, the elastomer of the adjacent end spring 52' flows into each recess 92 and against the abutment 98 thereby limiting radial expansion of the elastomer of the adjacent end spring 52' along at least two axes which are generally indicated in FIG. 11 by reference numerals 89' and 89". Notably, the angular disposition of the two axes 89' and 89" illustrated in FIG. 11 are for exemplary purposes and this disclosure should not be construed or interpreted as being limited to the particular angular disposition of the axes shown in the drawing. Moreover, and although shown in FIG. 11 as being in generally normal or generally perpendicular relationship relative to each other, the axes 89' and 89" are not and do not necessarily have to be disposed in generally normal or generally perpendicular relationship relative to each other.

Alternatively, the surface incongruity 80 can be defined by an annular projection or a series of equi-angularly and like shaped projections which depend from surface 74 on the spring seat 70. Suffice it to say, the annular projection or series of projections defining surface incongruity 80 on spring seat 70 extends away from the spring seat surface 74 and has a radial shoulder which serves to grip and resist radial movement of the elastomer of the adjacent end spring 52' during compression of spring 50. Such annular projection or series of annular projections would preferably be arranged concentric to the longitudinal draft gear axis 14. In a preferred embodiment, the projection or series of equi-angularly spaced projections would be radially spaced from the longitudinal draft gear axis by a distance slightly greater than the radius of the predetermined diameter PD of the elastomeric preform 60 (FIG. 3) used to form the end spring 52'. When draft gear 10 is compressed, the projection or series of projections defining the surface incongruity 80 press axially into and the elastomer of the adjacent end spring 52'. As such, the surface incongruity 80 resists easy flowing movement of the elastomer of end spring 52' radially outward from axis 14.

Returning FIG. 1, a spring contacting surface 104 on the end wall 29 of housing 12 preferably defines a recess 108 coaxially arranged relative to the longitudinal draft gear axis 14. Recess 108 is configured to accommodate and fit closely about and along the axial extension 62 of the adjacent end spring 52' thereby enhancing axial alignment between spring assembly 50 and the longitudinal draft gear axis 14. As will be appreciated, coaxially arranging the recess 108 relative to the longitudinal draft gear axis 14 beneficially allows recess 108 to be formed when the housing 12 is cast.

Figure 13:
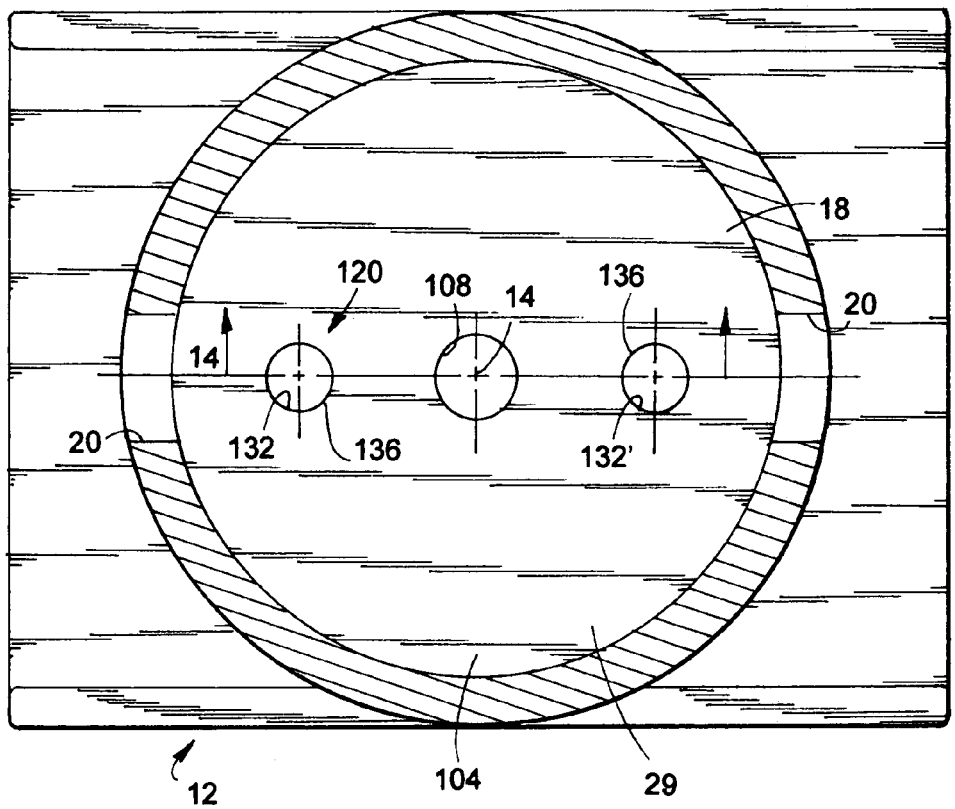
FIG. 13 is a sectional view taken along line 13-13 of FIG. 1.
Figure 14:
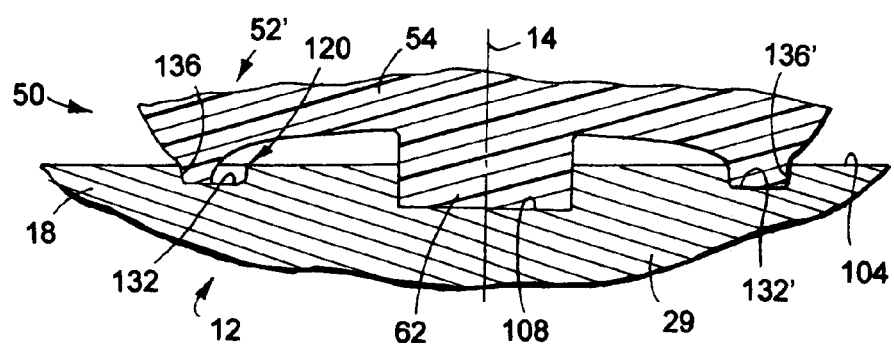
FIG. 14 is an enlarged sectional view taken along line 14-14 of FIG. 13.

In a preferred form, the draft gear housing 12 is also configured to establish a bonding relationship between the end of spring assembly 50 and the draft gear housing 12. Preferably, and as shown in FIGS. 13 and 14, the spring contacting surface 104 on the end wall 29 of the draft gear housing 12 further defines at least one incongruity for allowing the elastomer of the adjacent end spring 52' (FIG. 14) to combine therewith and establish a mechanical bond between the end of the spring assembly 50 and housing 12. As with the incongruity 80 mentioned above, the purpose of the incongruity on the spring contacting surface 104 of draft gear housing 12 is to grip and resist radial elastomer flow during compression of the end spring 52'.

The surface incongruity on the spring contacting surface 104 of draft gear housing 12 can take a myriad of different designs without detracting or departing from the true spirit and scope of the present disclosure. One form of surface incongruity, generally identified by reference numeral 120, is shown by way of example in FIGS. 13 and 14. The incongruity 120 on the spring contacting surface 104 of draft gear housing 12 is defined by a pair of recesses 132, 132' arranged to diametrically opposed sides of recess 108. To reduce the costs of forming the incongruity 120 in conjunction with the housing 12, the recesses 132, 132' are preferably arranged in line with and along a parting line of the casting forming the draft gear housing 12.

Preferably, the recesses 132, 132' are equidistantly spaced from the longitudinal centerline 14 of the housing 12. In a most preferred form, the recesses 132, 132' are spaced apart by a distance generally equal to the predetermined diameter PD of the elastomeric preform 60 (FIG. 3) used to form the end spring 52'. As shown in FIG. 14, each recess 132, 132' defines an open cavity arranged adjacent to the end of the spring assembly 50.

Preferably, the recesses 132, 132' are substantially identical relative to each other such that they apply an equal gripping force to the end spring 52' upon compression of the spring assembly 50. In the exemplary embodiment, each recess 132, 132' has a diameter ranging between about 0.437 inches and about 0.75 inches. In a preferred form, each recess 132, 132' has a diameter of about 0.563 inches. Moreover, each recess 132, 132' preferably has a depth ranging between about 0.77 inches and about 0.125 inches. In a preferred embodiment, each recess has a depth of about 0.094 inches.

As shown in FIG. 14, each recess 132, 132' defines a radial shoulder or abutment 136, 136', respectively, extending generally normal to the spring contacting surface 104 of the draft gear housing 12 for limiting radial expansion of the of the end spring 52' arranged adjacent to surface 104 upon compression of the spring assembly 50. Of course, the shoulder 136, 136' of each recess 132, 132', respectively, can be angled between about 65° and about 100° relative to surface 104 of housing 12 without detracting or departing from the spirit and scope of the present disclosure. When draft gear 10 is compressed, the elastomer of the adjacent end spring 52' flows into each recess 132, 132' and against the abutment 136, 136', respectively, so as to preferably form a mechanical bond between the end of spring assembly 50 and housing surface 104.

Alternatively, and while serving the same purpose and functioning substantially the same as the surface incongruity mentioned above, the surface incongruity 120 can include more than one recess arranged on opposite sides of recess 108; with each recess of the incongruity defining an open cavity arranged adjacent to the end of the spring assembly 50. The recesses forming this embodiment of surface incongruity are shaped substantially similar to recesses 132, 132' discussed above. In this embodiment, at least one of the pairs of recesses arranged to opposite sides of the longitudinal axis 14 of the draft gear housing 10 are spaced apart by a distance generally equal to the predetermined diameter PD of the elastomeric preform 60 (FIG. 3) used to form the end spring 52'. The other pair of recesses arranged to opposite sides of the longitudinal axis 14 of the draft gear housing 10 are spaced apart by a distance less than the predetermined diameter PD of the elastomeric preform 60 (FIG. 3) used to form the end spring 52'. Moreover, each pair of recesses arranged to one side of the longitudinal axis 14 of the draft gear housing 10 can be of equal diameter or they can be of unequal diameter relative to each other as long as the pair of recesses on the opposite side of the longitudinal axis 14 of draft gear housing 10 correspond thereto. Moreover, and to reduce manufacturing costs, all the recesses used to form the incongruity 120 are preferably arranged in line with and along a parting line of the casting forming the draft gear housing 12.

Figure 3:
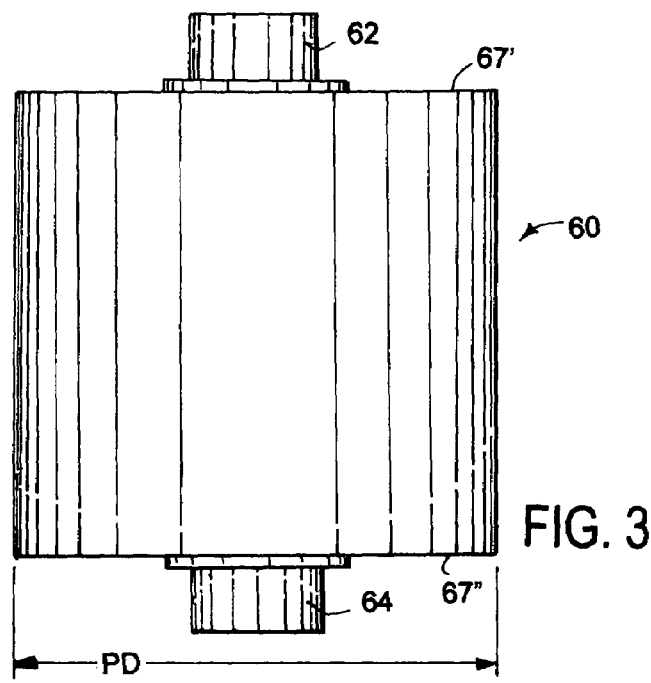
FIG. 3 is a side view of an elastomeric preform used to form an elastomeric spring used in operable combination with the railcar draft gear shown in FIG. 1.
Figure 15:
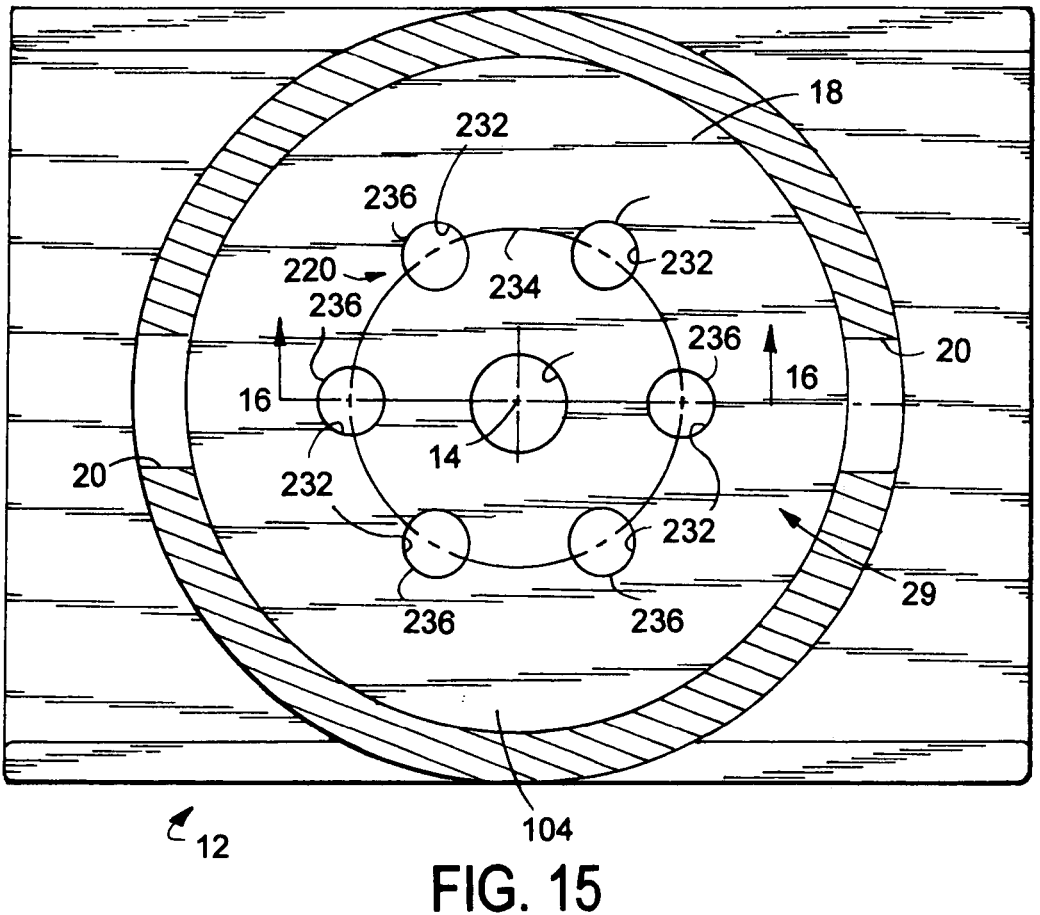
FIG. 15 is a view similar to FIG. 13 showing an alternative form of spring engaging surface on the draft gear housing.
Figure 16:
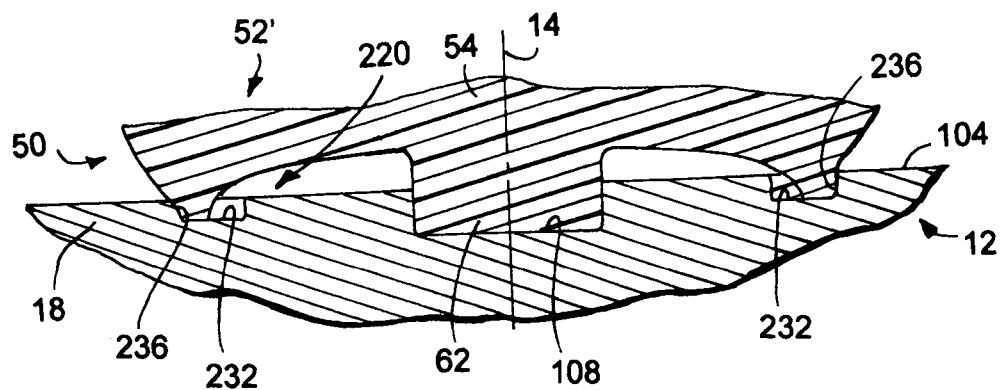
FIG. 16 is an enlarged sectional view taken along line 16-16 of FIG. 15.

Another alternative surface incongruity, represented generally by reference numeral 220, is shown by way of example in FIGS. 15 and 16. Notably, the surface incongruity 220 can be more difficult to form on the spring contacting surface 104 of draft gear housing 12 than incongruity 120. In this alternative form of incongruity, a series of recesses 232 are arranged in a generally circular pattern about an annular centerline 234. The annular centerline 234 for the recesses 232 is a predetermined radial distance from the longitudinal axis 14 of the draft gear 10. Preferably, the diameter of the annular centerline 234 for the recesses 232 is generally equal to the predetermined diameter PD of the elastomeric preform 60 (FIG. 3). The series of recesses 232 are preferably equiangularly disposed relative to each other and, preferably, are of equal diameter such that an equal gripping force is applied to the end spring 52'.

Each of the recesses 232 are configured substantially similar to the recesses 132, 132' described above. As illustrated in FIG. 16, each recess 232 defines a radial shoulder or abutment 236 extending generally normal to the spring contacting surface 104 of the draft gear housing 12 for limiting radial expansion of the of the elastomer of the end spring 52' arranged adjacent to the surface 104 of the draft gear housing 12 upon compression of the spring assembly 50. Of course, the shoulder 236 of each recess 232 can be angled between about 65° and about 100° relative to surface 104 of housing 12 without detracting or departing from the spirit and scope of the present disclosure. When draft gear 10 is axially compressed, the elastomer of the adjacent spring 52' flows into the incongruity 220 and against the abutment 236 of each recess 232 thereby forming a mechanical bond between the adjacent end of the spring assembly 50 and draft gear housing 12.

Figure 17:
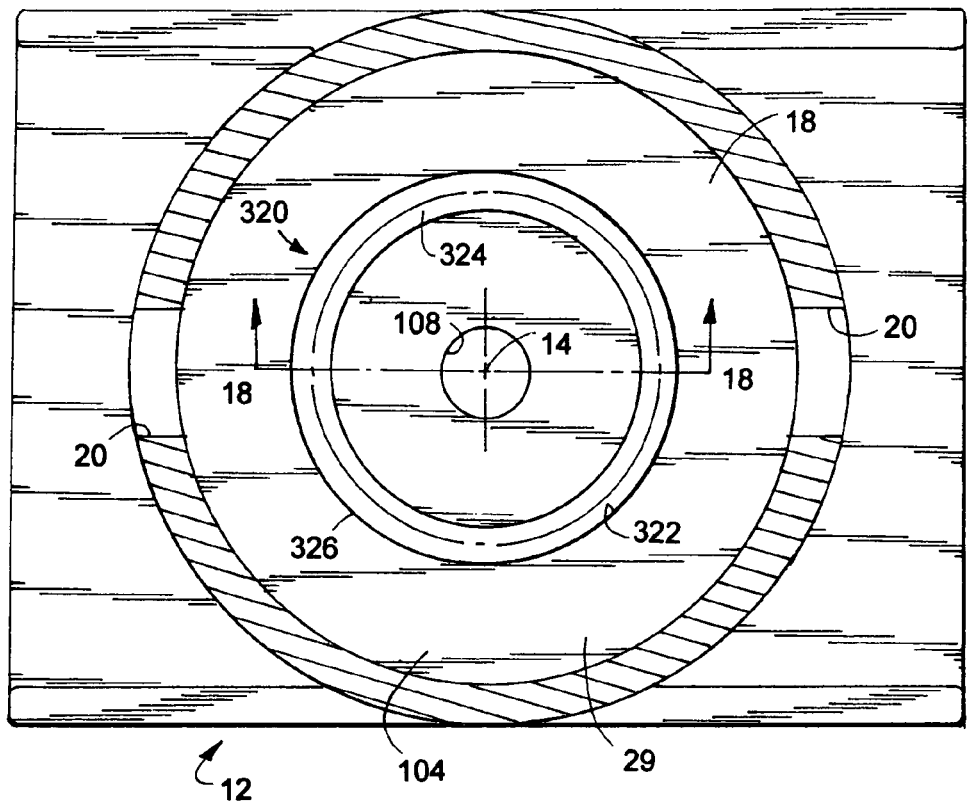
FIG. 17 is another view similar to FIG. 13 showing another form of spring engaging surface on the draft gear housing.
Figure 18:
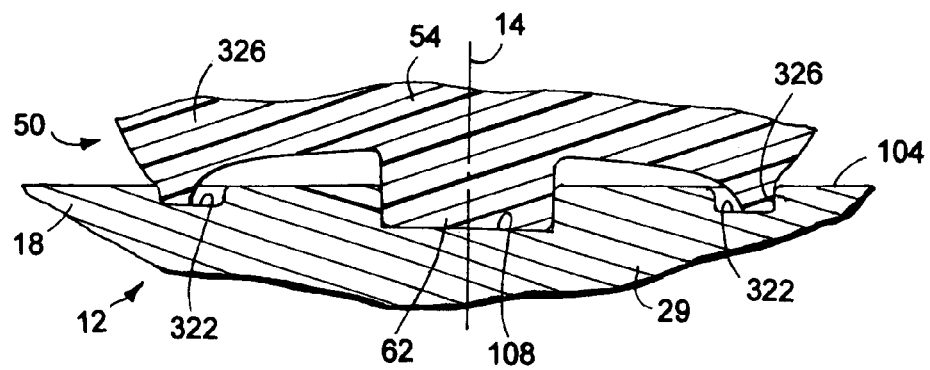
FIG. 18 is an enlarged sectional view taken along line 18-18 of FIG. 17.

Still another form of surface incongruity, represented generally by reference numeral 320, is shown by way of example in FIGS. 17 and 18. Like incongruity 220, the surface incongruity 320 can be more difficult to form on the spring contacting surface 104 of draft gear housing 12 than incongruity 120. In this alternative form of surface incongruity 320, an annular groove or recess 322 is concentrically arranged about the longitudinal axis 14 of draft gear 10. The annular groove 322 defines an annular centerline 324 spaced a predetermined radial distance from the longitudinal axis 14 of the draft gear 10. Preferably, the diameter of the annular centerline 324 is generally equal to the predetermined diameter PD of the elastomeric preform 60 (FIG. 3) used to form spring 52'.

The annular groove or recess 322 is shaped substantially similar to the annular recess 82 discussed above regarding surface incongruity 80. In the exemplary embodiment illustrated in FIGS. 17 and 18, the annular groove 322 defines a radial abutment 326 for limiting radial expansion of the of the elastomeric spring 52' arranged adjacent to the closed end 18 of the draft gear housing 12. When draft gear 10 is axially compressed, the elastomer of the adjacent end spring 52' flows into the incongruity 320 and against the abutment 326 thereby forming a mechanical bond between the adjacent end of the spring assembly 50 and draft gear housing 12.

As will be appreciated from an understanding of the present disclosure, the overall manufacturing cost of the draft gear 10 is reduced through elimination of multiple parts used to form spring assembly 50. This advantageous result has been accomplished with no reduction in draft gear performance, or interferences with tried and accepted production methods. Although multiple metal plates associated with the end springs 52', arranged adjacent to the spring seat 70 and to the end wall 29 of the draft gear housing 12, have been eliminated, thus resulting in costs savings, positive alignment of the spring assembly 50 relative to the longitudinal axis 14 of the draft gear 10 has been maintained coupled with the ability to maintain force control of the end spring 52' arranged adjacent to the spring seat 70 and end wall 29 of the draft gear housing 12.

In a preferred form, radial twisting and snaking of the elastomeric spring 50 is inhibited so as to advantageously affect performance of the spring assembly 50. Notably, the projection 62 axially extending from the end spring 52' arranged adjacent to the spring seat 70 is received and accommodated within the recess 78 defined by the spring seat 70. As such, the end spring pad 52' is maintained in axial alignment with the spring seat 70 thus effectively assuring transference of the forces applied to the spring seat 70 from the friction clutch assembly 22 in a direction axially aligned with the longitudinal axis 14 of the draft gear 10 thus optimizing performance of the spring assembly 50.

With regard to the other end of spring assembly 50, the projection 62 axially extending from the end spring 52' arranged adjacent to the spring engaging surface 104 of the end wall 29 of housing 12 is received and accommodated within the recess 108 defined by the end wall 29 of housing 12. As such, the end of spring assembly 50 arranged adjacent to the end wall 29 of housing 12 is likewise maintained in axial alignment with the longitudinal axis 14 of the draft gear 10 thus optimizing performance of the spring assembly 50.

Moreover, the incongruities, in whatever form, provided on the spring seat 70, serve to grip the elastomer of and inhibit the end spring 52' arranged in contact with the spring seat 70 from easily flowing along the spring contacting surface 74 of the spring seat 70. As will be appreciated from an understanding of this disclosure, the at least one surface incongruity provided on the spring seat 70 serves to operably control radial expansion of the end spring 52' arranged adjacent to the spring seat 70 along at least two axes thus resulting in a spring assembly having greater compressive strength.

Similarly, the incongruities, in whatever form, on the spring contacting surface 104 of the draft gear housing rear wall 29 grip and inhibit the end spring 52' arranged in contact with the draft gear housing rear wall 29 from easily flowing along the spring contacting surface of the housing 12. As such, the surface incongruities provided on the rear wall 29 of the draft gear housing 12 operably control radial expansion of the end spring 52' arranged adjacent to draft gear housing end wall 29 thus resulting in a spring assembly with greater compressive strength.

From the foregoing, it will be observed that numerous modifications and variations can be made and effected without departing or detracting from the true spirit and novel concept of the present invention. Moreover, it will be appreciated, the present disclosure is intended to set forth an exemplification of the invention which is not intended to limit the invention to the specific embodiment illustrated. Rather, this disclosure is intended to cover by the appended claims all such modifications and variations as fall within the spirit and scope of the claims.

What is claimed is:

1. A railroad car draft gear comprising:
   a hollow housing open at a first end and closed toward a second end, said housing defining a longitudinal axis for said draft gear;
   a series of friction members spaced about said longitudinal axis and arranged in operable combination with the open end of said housing;
   a wedge arranged for axial movement relative to the open end of said housing and against which an exterior force can be applied, with said wedge being arranged in operable combination with said series of friction members;
   an elongated elastomeric spring assembly axially disposed within said hollow housing for storing energy applied to said wedge during axial compression of said draft gear, with a first end of said spring assembly being arranged in contacting relation with the closed end of said housing; and
   a spring seat arranged within said housing between said spring assembly and an end portion of each friction member, with said spring seat extending generally normal to the longitudinal axis of said draft gear and defining a surface arranged in direct contacting relation with an elastomer pad arranged at a second end of said spring assembly, with said spring contacting surface on said spring seat defining at least one surface incongruity for limiting radial expansion of the elastomer of said pad at the second end of said spring assembly along at least two axes when an axial load is applied to the wedge of said draft gear.

2. The railroad car draft gear according to claim 1, wherein the spring contacting surface of said spring seat defines a recess coaxially arranged relative to the longitudinal axis of said housing.

3. The railroad car draft gear according to claim 1, wherein the incongruity on the spring contacting surface of said spring seat is defined by an annular groove concentrically arranged about the longitudinal axis of said housing.

4. The railroad car draft gear according to claim 1, wherein the incongruity on the spring contacting surface of said spring seat is defined by a series of equi-angularly disposed recesses concentrically arranged about the longitudinal axis of said housing.

5. The railroad car draft gear according to claim 1, wherein an interior surface on a rear wall of said housing is arranged in direct contacting relation relative to an elastomer pad arranged at said first end of said spring assembly, with the interior surface on the rear wall of said housing defining an incongruity for limiting radial expansion of the elastomer of said pad at said opposed end of said spring assembly when an axial compressive load is applied to the wedge of said draft gear.

6. The railroad car draft gear according to claim 5, wherein the incongruity on the spring contacting surface of the rear wall of said housing is defined by at least two recesses, with one recess being disposed to each side of the longitudinal axis of said housing.

7. The railroad car draft gear according to claim 5, wherein the incongruity on the spring contacting surface of the rear wall of said housing is defined by an annular groove concentrically arranged about the longitudinal axis of said housing.

8. A railroad car draft gear comprising:
   an axially elongated hollow housing open at a first end and closed toward a second end, said housing defining a longitudinal axis for said draft gear;
   a series of friction members equally spaced about said longitudinal axis and arranged in operable combination with the open end of said housing;
   a wedge arranged for axial movement relative to the open end of said housing and against which an exterior force can be applied, with said wedge being arranged in operable combination with said series of friction members;
   a multi-tiered spring assembly arranged within said hollow housing for storing energy applied to said wedge during axial compression of said draft gear, with a first end of said spring assembly being arranged in contacting relation with the closed end of said housing, and with said spring assembly including a series of stacked elastomeric springs with a plate between each pair of axially adjacent springs; and
   a spring seat arranged within said housing between said spring assembly and an end portion of each friction member, with said spring seat extending generally normal to the longitudinal axis of said draft gear and defining a surface arranged in contiguous relation with said elastomeric spring located at a second end of said spring assembly, with said spring contacting surface on said spring seat defining at least one incongruity for allowing the elastomer of the spring arranged adjacent to the spring seat to flow into operable combination with said incongruity thereby limiting radial expansion of the elastomeric spring arranged adjacent to the spring seat along at least two axes.

9. The railroad car draft gear according to claim 8, wherein the spring contacting surface of said spring seat defines a recess coaxially arranged relative to the longitudinal axis of said housing.

10. The railroad car draft gear according to claim 8, wherein the incongruity on the spring contacting surface of said spring seat is defined by an annular groove concentrically arranged about the longitudinal axis of said housing.

11. The railroad car draft gear according to claim 8, wherein the incongruity on the spring contacting surface of said spring seat is defined by a series of equi-angularly disposed recesses concentrically arranged about the longitudinal axis of said housing.

12. The railroad car draft gear according to claim 8, wherein an interior surface on a rear wall of said housing arranged in contiguous relation relative to the elastomer of a spring at said first end of said spring assembly, and with the interior surface on the rear wall of said housing defining an incongruity for limiting radial expansion of the elastomer of the spring at said first end of said spring assembly when an axial compressive load is applied to the wedge of said draft gear.

13. The railroad car draft gear according to claim 12, wherein the incongruity on the spring contacting surface of the rear wall of said housing is defined by a pair of recess, with one recess being arranged on each side of the longitudinal axis of the draft gear.

14. The railroad car draft gear according to claim 12, wherein the incongruity on the spring contacting surface of the rear wall of said housing is defined by an annular groove concentrically arranged about the longitudinal axis of said housing.

15. A railroad car draft gear comprising:
an elongated hollow housing open at a first end and closed toward a second end, said housing defining a longitudinal axis for said draft gear;
a plurality of friction members spaced about said longitudinal axis and arranged in operable combination with the open end of said housing;
a wedge arranged for axial movement relative to the open end of said housing and against which an exterior force can be applied, with said wedge being arranged in operable combination with said series of friction members;
a multi-tiered spring assembly arranged within said hollow housing for storing energy applied to said wedge during axial compression of said draft gear, with a first end of said spring assembly being arranged in contacting relation with the closed end of said housing, and with said spring assembly including a series of stacked elastomeric springs pads with at least one plate between each pair of axially adjacent elastomeric springs, and wherein a second end of said spring assembly defines a protrusion arranged generally coaxial with the axis of said housing and axially extending from the elastomeric spring at the second end of said spring assembly;
a spring seat arranged in said housing between said spring assembly and an end portion of each friction member, with said spring seat defining a surface arranged in direct contacting relation with an elastomer of an adjacent spring pad at a second end of said spring assembly, with said surface on said spring seat defining a central recess for accommodating the protrusion axially extending from the second end of said spring assembly and an incongruity for allowing the elastomer of the spring pad arranged adjacent to the spring seat to deform into said incongruity thereby limiting radial expansion of the adjacent elastomer spring pad along at least two axes at the second end of said spring assembly.

16. The railroad car draft gear according to claim 15, wherein the incongruity on the spring contacting surface of said spring seat is defined by an annular groove concentrically arranged about the longitudinal axis of said housing.

17. The railroad car draft gear according to claim 15, wherein the incongruity on the spring contacting surface of said spring seat is defined by a series of equi-angularly disposed recesses concentrically arranged about the longitudinal axis of said housing.

18. The railroad car draft gear according to claim 15, wherein an interior surface on a rear wall of said housing is arranged in direct contacting relation relative to the elastomer of the spring pad arranged adjacent to the interior surface of the lower wall of said housing at said first end of said spring assembly, with the interior surface on the rear wall of said housing defining an incongruity for limiting radial expansion of the elastomeric pad at said first end of said spring assembly when a axial compressive load is applied to the wedge of said draft gear.

19. The railroad car draft gear according to claim 18, wherein the incongruity on the spring contacting surface of the rear wall of said housing is defined by a pair of recesses, with one recess being arranged to each side of the longitudinal axis of the draft gear.

20. The railroad car draft gear according to claim 18, wherein the incongruity on the spring contacting surface of the rear wall of said housing is defined by an annular groove concentrically arranged about the longitudinal axis of said draft gear.

* * * * *